(12) United States Patent
Hegner et al.

(10) Patent No.: US 8,176,791 B2
(45) Date of Patent: May 15, 2012

(54) ELASTIC CERAMIC BODY AND PRESSURE SENSOR WITH AN ELASTIC CERAMIC BODY

(75) Inventors: Frank Hegner, Lörrach (DE); Andreas Rossberg, Bad Säckingen (DE)

(73) Assignee: Endress + Hauser GmbH + Co. KG, Maulberg (DE)

( * ) Notice: Subject to any disclaimer, the term of this patent is extended or adjusted under 35 U.S.C. 154(b) by 35 days.

(21) Appl. No.: 12/312,722

(22) PCT Filed: Nov. 27, 2007

(86) PCT No.: PCT/EP2007/062841
§ 371 (c)(1),
(2), (4) Date: Jan. 27, 2010

(87) PCT Pub. No.: WO2008/065092
PCT Pub. Date: Jun. 5, 2008

(65) Prior Publication Data
US 2011/0041618 A1   Feb. 24, 2011

(30) Foreign Application Priority Data
Nov. 27, 2006 (DE) .......................... 10 2006 056 172

(51) Int. Cl.
*G01L 13/02* (2006.01)
(52) U.S. Cl. ........................................................ 73/716
(58) Field of Classification Search .................. None
See application file for complete search history.

(56) References Cited

U.S. PATENT DOCUMENTS

| | | | | |
|---|---|---|---|---|
| 4,589,291 A | * | 5/1986 | Sander | 73/862.627 |
| 5,197,805 A | * | 3/1993 | Wilson | 374/208 |
| 5,296,288 A | | 3/1994 | Kourtides | |
| 2011/0036176 A1 | * | 2/2011 | Bradley et al. | 73/756 |

FOREIGN PATENT DOCUMENTS

| | | |
|---|---|---|
| DE | 39 12 217 A1 | 10/1990 |
| DE | 199 43 075 A1 | 3/2001 |
| DE | 103 26 975 A1 | 1/2005 |
| DE | 600 14 451 T2 | 12/2005 |
| DE | 10 2004 031 582 A1 | 2/2006 |
| EP | 0 453 704 A2 | 10/1991 |

* cited by examiner

*Primary Examiner* — Andre Allen
(74) *Attorney, Agent, or Firm* — Bacon & Thomas, PLLC

(57) ABSTRACT

An elastic ceramic body and a pressure sensor. The elastic ceramic body comprises: a base body of an elastic ceramic material; and a cover layer, which covers at least one section of a surface of the base body, wherein the cover layer is of a material other than that of the base body, and the cover layer comprises microcrystalline $Al_2O_3$ (corundum). The cover layer is preferably prepared in a sol gel process. The pressure sensor, comprises: a disk-shaped measuring membrane, which is embodied as an elastic ceramic body according to the above definition; and at least one membrane support body, on which the measuring membrane is connected at its edge region along an encircling joint to form a pressure-tight measuring chamber between the membrane support body and the measuring membrane.

18 Claims, 2 Drawing Sheets

ELASTIC CERAMIC BODY AND PRESSURE SENSOR WITH AN ELASTIC CERAMIC BODY

TECHNICAL FIELD

The present invention relates to an elastic ceramic body, especially a pressure sensor having an elastic ceramic body.

BACKGROUND DISCUSSION

An elastic body of this type can comprise any body, which exhibits, under action of a force or a pressure, a reversible deflection from its equilibrium position. An example of such a body is a ceramic measuring membrane, or diaphragm, of a pressure sensor. A pressure sensor having such a measuring membrane is disclosed, for example, in German Published Application Offenlegungsschrift DE 39 12 217. Such pressure sensors are applied frequently in process measurements applications, wherein the measuring membranes are, not seldomly, subjected to corrosive media. The measuring membrane of DE 39 12 217 includes, as a base material, an aluminum oxide ceramic or silicon, wherein at least the media-side surface of the measuring membrane has a protective layer of silicon carbide, in order to increase its corrosion resistance as an isolating membrane. This protective layer is prepared by means of a plasma supported chemical gas phase deposition (PECVD, for the English, Plasma Enhanced Chemical Vapor Deposition). To the extent, however, that the surfaces of the base material have significant roughness, the SiC layers prepared by means of PECVD on these substrates have a relatively large defect density, so that, while having an improved corrosion resistance compared with uncoated membranes, their corrosion resistance still leaves something to be desired.

SUMMARY OF THE INVENTION

It is, therefore, an object of the present invention to provide an elastic ceramic body and a pressure sensor with such a body, having a further improved corrosion resistance compared to the state of the art.

The object is achieved according to the invention by an elastic ceramic body which comprises a base body, which has an elastic ceramic material, and at least one cover layer, which covers at least one section of a surface of the base body, characterized in that the cover layer has a material other than that of the base body, and the cover layer comprises, or consists essentially thereof, microcrystalline $Al_2O_3$ (corundum).

The material of the cover layer can differ from the material of the base body, for example, as regards microstructure and/ or as regards chemical composition.

The microcrystalline $Al_2O_3$ has in a currently preferred embodiment an average crystal diameter $D_m$ of not more than 1 μm, preferably not more than 0.7 μm, further preferably not more than 0.5 and especially preferably not more than 0.35 μm, wherein $D_m$ is defined as $$D_m \equiv \frac{1}{N} \cdot \sum_{i=1}^{N} D_i,$$

and the $D_i$ are the diameters of the visible N microcrystals in any image of a cross section through the cover layer.

The microcrystalline $Al_2O_3$ has in a currently preferred embodiment a maximum crystal diameter $D_t$ of not more than 1.5 μm, further preferably not more than about 1 μm.

In a currently preferred embodiment of the invention, the cover layer is sufficiently sealed and has a sufficient coating thickness, in order to slow, or prevent, corrosion of the base body.

In a further development of the invention, the cover layer has a coating thickness of not less than 1 μm, preferably not less than 2 μm.

Furthermore, it is currently preferred, that the mechanical properties of the elastic body are determined essentially by the base body. Additionally, it is, in the case of different coefficients of thermal expansion of the material of the cover layer and the material of the base body, advantageous, when the cover layer essentially follows the behavior of the base body and does not exhibit an expansion behavior independent of the base body. For both reasons, it is required, that the coating thickness of the cover layer be essentially smaller than the material thickness of the base body. In a currently preferred embodiment of the invention, the coating thickness of the cover layer is no more than 10 μm, further preferably not more than 6 μm and especially preferably not more than 4 μm.

The cover layer is preferably prepared in a sol gel method or sol suspension method. This is based on preliminary steps, which are known to those skilled in the art, involving the manufacture of sols, which individually (in the sol gel method) or mixed with a corundum suspension (in the sol suspension method) are suitable for coating of the base body. Coating media prepared in such a way are then applied in suitable manner onto the surface sections of the base body to be coated.

Especially in the case of a complete coating of the surfaces of the base body, the coating medium can be applied by immersion. The coating of an individual planar surface can occur by spin coating.

Following the coating are heat treatments for drying, for example, at 100° C. to 150° C., and for burning out of aid materials, for example, at about 500° C. to 600° C. Then the cover layer material can be sintered at higher temperatures to a dense corundum cover layer.

In a first further development of the invention, the base body likewise includes corundum, wherein, as material for the base body, corundum of lesser purity and larger crystal domains can be used.

In a second further development of the invention, the base body includes zirconium dioxide ($ZrO_2$) in the tetragonal phase. Zirconium dioxide in the tetragonal phase has very attractive properties for application in elastic ceramic bodies. It has, on the one hand, a smaller modulus of elasticity than corundum and, on the other hand, a higher bending strength. As a result, a deformation body, which has this material, enables the construction of force, or pressure, sensors, which, first of all, are sensitive and, second, better withstand overloads.

The tetragonal phase of pure zirconium dioxide is, however, metastable, so that additives of other oxides are required for stabilizing the tetragonal phase. These additives can include, for example, $Y_2O_3$, $CeO_2$, $CaO$, $MgO$, $Sc_2O_3$, $SiO_2$, $TiO_2$, $Al_2O_3$, $HfO_2$, or $YbO_3$ or mixtures of these oxides. Zirconium oxide ceramics stabilized in the tetragonal phase (TZP, for Tetragonal Zirconia Polycrystal) can contain the named additives at some few mol-% up to some 10 mol-%. Thus, for example, the so called 3Y TZP ceramic contains an addition of about 3 mol-% $Y_2O_3$ as stabilizer, while TZP stabilized with $CeO_2$, for example, has 12-20 mol-% $CeO_2$.

TZP is of interest as a material, to this point in time, especially in dentistry. Marcel Schweiger gives in the article "ZIRCONIUM OXIDE, HIGH-STRENGTH AND FRACTURE-TOUGH STRUCTURAL CERAMIC" (Aesthetic Dentistry 5, (2004) Pgs. 248-257) an overview of some TZP variants.

Although the TZP variants named in this article can be suitable for dental applications, nevertheless their use in process measurements technology is not possible without further consideration, since, there, the materials are exposed to higher temperatures and corrosive media, so that corrosion, or hydrothermal deterioration of unprotected surfaces is to be feared. The elastic ceramic body of the invention includes, however, a cover layer of microcrystalline corundum, so that the TZP of the base body is protected by the cover layer.

A pressure sensor of the invention includes, for example, a disk-shaped measuring membrane, which is embodied as a ceramic body of the invention. The membrane includes a disk shaped, base body, wherein at least one surface of the base body has a cover layer, which is composed of microcrystalline corundum. In a further development of the invention, all surfaces of the base body are coated with a cover layer of microcrystalline corundum.

The base body of the measuring membrane can, according to the above embodiment, contain, for example, TZP or corundum.

The object of the invention is also achieved by a pressure sensor includes, furthermore, at least one membrane support body, to which the measuring membrane is connected with its edge region along an encircling joint to form a pressure-tight measuring chamber between the membrane support body and the measuring membrane.

The joint can include, for example, glass or an active braze, or active hard solder.

The coefficient of thermal expansion of the material of the membrane support body preferably equals that of the material of the base body. In a currently preferred embodiment of the invention, the membrane support body and the base body are essentially of the same material.

The pressure sensor can be an absolute pressure sensor, a relative pressure sensor or a pressure difference sensor, wherein the pressure difference sensor can be a so-called one chamber, pressure difference sensor with two measuring membranes, which are coupled either via liquid enclosed between them in a measuring chamber, or via a lifter, which extends through the one measuring chamber, or it can be a two chamber sensor with only one measuring membrane, which divides the inner space of the sensor into two measuring chambers.

For transducing the pressure dependent deformation of the measuring membrane into a signal, all principles known to those skilled in the art can be considered, especially a capacitive transducing utilizing at least one electrode on the measuring membrane, a (piezo-)resistive transducing with deformation dependent resistance elements on the measuring membrane, or frequency transducing with an oscillator on the measuring membrane, wherein the oscillator has a deformation dependent eigenfrequency. In the case of a one chamber, pressure difference sensor, each one of the measuring membranes can have one of the named transducer elements. Details of the transducing are known to those skilled in the art and need not be described here in greater detail.

BRIEF DESCRIPTION OF THE DRAWING

The pressure sensor of the invention will now be explained on the basis of an example of an embodiment illustrated in the drawings, which show as follows.

The pressure sensor of the invention 10 includes a disk shaped base body 11, which is connected pressure-tightly along its periphery with a cylindrical membrane support body 12 by way of an encircling joint 13. Joint 13 is formed in a high vacuum process by means of an annular, active braze preform. The base body 11 and the membrane support body 12 comprise conventional sintered corundum of 96% purity.

DETAILED DISCUSSION IN CONJUNCTION WITH THE DRAWINGS

Figure 1:
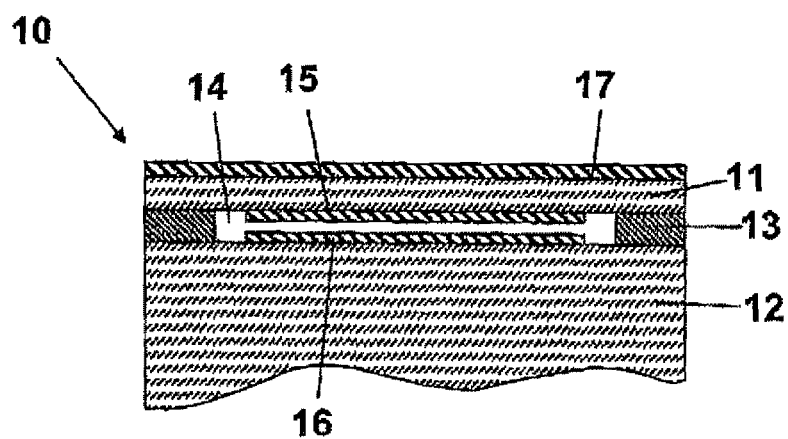
FIG. 1 is a longitudinal section through a pressure sensor of the invention.
Figure 2:
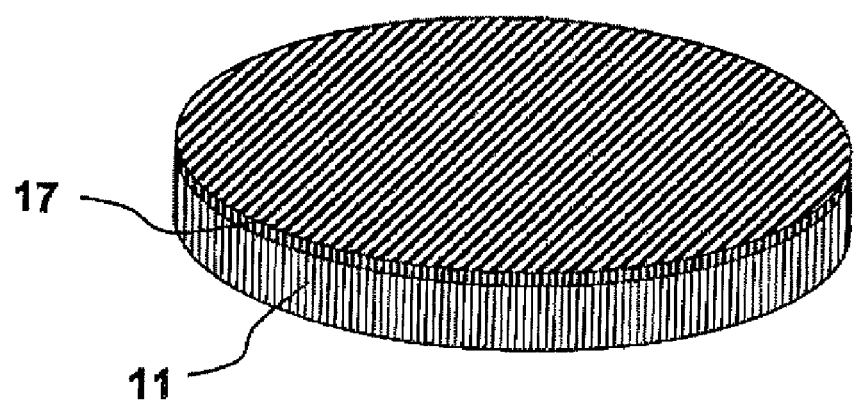
FIG. 2 is a perspective view of top layers of the pressure sensor.

The base body 11, the membrane support body 12 and the joint 13 bound a measuring chamber 14, wherein, on the mutually facing surfaces of the base body 11 and the membrane support body 12 in the measuring chamber, a first electrode 15 and a second electrode 16 are applied. The electrodes can be, for example, of Ta. On its surface facing away from the measuring chamber 14, the base body has a cover layer 17 (FIGS. 1 and 2) of microcrystalline corundum with a coating thickness of about 4 μm and an average crystal size of about 0.4 μm. The cover layer is prepared before the Ta electrode is applied and before the base body is joined with the membrane support body.

The base body 11 and the cover layer 17 form together the measuring membrane of the pressure sensor. The measuring membrane is an example of an elastic ceramic body of the invention.

The cover layer is prepared by means of a sol gel method. Following spin coating of a coating medium, there occurs drying at 120° C., then burning out of aid materials at about 550° C. Finally, the cover layer material can be sintered at higher temperatures to a dense, microcrystalline corundum, cover layer.

The invention claimed is:
1. An elastic ceramic body, comprising:
   a base body of an elastic ceramic material; and
   a cover layer, which covers at least one section of a surface of said base body, wherein:
   said cover layer is of a material other than that of said base body; and
   said cover layer comprises microcrystalline $Al_2O_3$ (corundum).
2. The elastic ceramic body as claimed in claim 1, wherein:
   the material of said cover layer differs from the material of said base body as regards microstructure and/or as regards chemical composition.
3. The elastic ceramic body as claimed in claim 1, wherein:
   said microcrystalline $Al_2O_3$ has an average crystal diameter $D_m$ of not more than 1 μm, preferably not more than 0.7 μm, further preferably not more than 0.5 and especially preferably not more than 0.35 μm.
4. The elastic ceramic body as claimed in claim 1, wherein:
   said microcrystalline $Al_2O_3$ has a maximum crystal diameter of not more than 1.5 μm, preferably not more than about 1 μm.
5. The elastic ceramic body as claimed in claim 1, wherein:
   said cover layer has a coating thickness of not less than 1 μm, preferably not less than 2 μm.
6. The elastic ceramic body as claimed in claim 1, wherein:
   the coating thickness of said cover layer is essentially smaller than the material thickness of said base body.

7. The elastic ceramic body as claimed in claim 1, wherein:
the coating thickness of said cover layer is not more than 10 μm, preferably not more than 6 μm and especially preferably not more than 4 μm.

8. The elastic ceramic body as claimed in claim 1, wherein:
said cover layer is prepared in a sol gel method or sol suspension method.

9. The elastic ceramic body as claimed in claim 1, wherein:
said base body comprises corundum.

10. The elastic ceramic body as claimed in claim 1, wherein:
said base body comprises tetragonal phase, zirconium dioxide.

11. The elastic ceramic body as claimed in claim 10, wherein:
the zirconium dioxide is present as TZP with additives of other oxides.

12. The elastic ceramic body as claimed in claim 11, wherein:
the additives comprise one of: $Y_2O_3$, $CeO_2$, $CaO$, $MgO$, $Sc_2O_3$, $SiO_2$, $TiO_2$, $Al_2O_3$, $HfO_2$, or $YbO_3$ or mixtures of these oxides.

13. A pressure sensor, comprising: 2
a disk-shaped measuring membrane, which is embodied as an elastic ceramic body having a base body of an elastic ceramic material, and a cover layer which covers at least one section of a surface of said base body, wherein said cover layer is of a material other than that of said base body, with said cover layer comprising microcyrstalline $Al_2O_3$; and at least one membrane support body, to which said measuring membrane is connected with its edge region along an encircling joint to form a pressure-tight measuring chamber between said membrane support body and said measuring membrane.

14. The pressure sensor as claimed in claim 13, wherein:
said measuring membrane has a disk shaped base body, and at least one surface of said base body has a cover layer, which is comprised of microcrystalline corundum.

15. The pressure sensor as claimed in claim 13, wherein:
said base body of said measuring membrane comprises TZP or corundum.

16. The pressure sensor as claimed in claim 13, wherein:
said membrane support body and said base body comprise essentially the same material.

17. The pressure sensor as claimed in claim 13, wherein:
said joint comprises glass or an active braze.

18. The pressure sensor as claimed in claim 13, wherein:
the pressure sensor is one of: an absolute pressure sensor, a relative pressure sensor or a pressure difference sensor.

* * * * *